United States Patent
Moeller et al.

(10) Patent No.: US 9,401,979 B2
(45) Date of Patent: Jul. 26, 2016

(54) METHOD FOR TRANSMITTING DATA BETWEEN A MOBILE TELEPHONE AND A MOTOR VEHICLE, AND MOTOR VEHICLE

(71) Applicant: AUDI AG, Ingolstadt (DE)

(72) Inventors: Malte Moeller, Regensburg (DE); Rainer Stahlmann, Hepberg (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/647,684

(22) PCT Filed: Oct. 18, 2013

(86) PCT No.: PCT/EP2013/003138
§ 371 (c)(1),
(2) Date: May 27, 2015

(87) PCT Pub. No.: WO2014/082697
PCT Pub. Date: Jun. 5, 2014

(65) Prior Publication Data
US 2015/0304473 A1    Oct. 22, 2015

(30) Foreign Application Priority Data
Nov. 27, 2012 (DE) .......................... 10 2012 023 109

(51) Int. Cl.
*H04W 4/16* (2009.01)
*H04M 1/60* (2006.01)
(Continued)

(52) U.S. Cl.
CPC ............ *H04M 1/6091* (2013.01); *H04L 67/12* (2013.01); *H04M 3/02* (2013.01); *H04W 4/008* (2013.01); *H04W 4/16* (2013.01); *H04W 76/026* (2013.01); *H04L 67/306* (2013.01); *H04W 84/18* (2013.01)

(58) Field of Classification Search
CPC ..... H04M 1/6091; H04M 3/02; H04W 4/008; H04W 4/16; H04L 67/12
USPC ......................................... 455/426, 41.1, 41.2
See application file for complete search history.

(56) References Cited

U.S. PATENT DOCUMENTS

2004/0209655 A1* 10/2004 Kubo ................... H04B 1/3877
455/569.1
2008/0143487 A1* 6/2008 Hulvey ................... G06F 13/24
340/10.34
(Continued)

FOREIGN PATENT DOCUMENTS

DE          10301190       8/2004
DE          102007050156   4/2009
(Continued)

OTHER PUBLICATIONS

Rainer Steffen et al., "Near Field Communication (NFC) in an Automotive Environment," Second International Workshop on Near Field Communication, IEEE, Apr. 20, 2010, pp. 15-20.
(Continued)

*Primary Examiner* — Siu Lee
(74) *Attorney, Agent, or Firm* — Staas & Halsey LLP

(57) ABSTRACT

A method transmits data between a mobile telephone and a motor vehicle. A first wireless communication connection is automatically established between the mobile telephone and the motor vehicle when a communication interface of the mobile telephone is activated in a corresponding manner, and driver-specific user data is transmitted from the mobile telephone to the motor vehicle, at least some of the user data being transmitted to the motor vehicle exclusively via a second communication connection according to the NFC standard.

20 Claims, 1 Drawing Sheet

(51) Int. Cl.
    *H04W 4/00*      (2009.01)
    *H04W 76/02*      (2009.01)
    *H04M 3/02*      (2006.01)
    *H04L 29/08*      (2006.01)
    *H04W 84/18*      (2009.01)

(56) References Cited

U.S. PATENT DOCUMENTS

| | | | |
|---|---|---|---|
| 2009/0075592 A1 | 3/2009 | Nystrom et al. | |
| 2009/0289109 A1* | 11/2009 | Sims | G06Q 20/12 235/380 |
| 2011/0177780 A1* | 7/2011 | Sato | H04W 36/14 455/41.1 |
| 2011/0210831 A1* | 9/2011 | Talty | H04B 5/0031 340/10.51 |

FOREIGN PATENT DOCUMENTS

| | | |
|---|---|---|
| DE | 102010009760 | 9/2011 |
| DE | 102011109041 | 1/2012 |
| DE | 102010033883 | 2/2012 |
| DE | 102010033901 | 2/2012 |
| DE | 102011009213 | 2/2012 |
| DE | 10 2012 023 109.1 | 11/2012 |
| EP | 1568970 | 8/2005 |
| EP | 2124177 | 11/2009 |
| WO | PCT/EP2013/003138 | 10/2013 |

OTHER PUBLICATIONS

German Office Action for German Priority Patent Application No. 10 2012 023 109.1, issued Aug. 2, 2013, 8 pages.

English language of the International Search Report for PCT/EP2013/003138, mailed Feb. 7, 2014, 2 pages.

WIPO English language translation of the International Preliminary Report on Patentability for PCT/EP2013/003138, downloaded from WIPO website on May 27, 2015, 11 pages.

\* cited by examiner

METHOD FOR TRANSMITTING DATA BETWEEN A MOBILE TELEPHONE AND A MOTOR VEHICLE, AND MOTOR VEHICLE

CROSS REFERENCE TO RELATED APPLICATIONS

This application is based on and hereby claims priority to International Application No. PCT/EP2013/003138 filed on Oct. 18, 2013 and German Application No. 10 2012 023 109.1 filed on Nov. 27, 2012, the contents of which are hereby incorporated by reference.

BACKGROUND

The invention relates to a method for transmitting data between a mobile telephone and a motor vehicle. The invention also relates to a motor vehicle.

The related art has already disclosed the practice of establishing a wireless communication connection between a mobile telephone and a motor vehicle, in particular via a corresponding communication device of the motor vehicle. For example, it is conceivable to use the "Bluetooth" communication standard for this purpose. While the motor vehicle is fundamentally searching for Bluetooth communication partners, possibly in an adjustable manner, the mobile telephone can be found by activating the Bluetooth communication interface on the latter and a connection can be established. It goes without saying that it is also conceivable to use other communication standards in which a communication interface on the mobile telephone is activated or can be activated and a wireless communication connection to the motor vehicle is established. The wireless communication connection can be used in the related art, for example, to use a hands-free device of the motor vehicle for making a telephone call, the mobile telephone being used to set up the telephone call.

The related art also discloses the practice of transmitting driver-specific useful data from the mobile telephone to the motor vehicle. For example, motor vehicles are already known which retrieve contacts and/or telephone numbers from the mobile telephone, with the result that said contacts and/or telephone numbers can be displayed to the driver in a simplified manner during the journey, for example via a man-machine interface, and can be selected by the driver. These are largely automatisms over which the user of the motor vehicle has no or little influence. However, some drivers attach great importance to the protection of their personal, driver-specific useful data and refuse transmission but would nevertheless like to use their mobile telephone in order to be able to make a telephone call in the motor vehicle, for example via a hands-free device.

Navigation systems for motor vehicles are also known. Such navigation systems use available digital map material to determine a route to a destination input by the driver. In known navigation systems, destinations are input manually, for example via a man-machine interface, or can be stored in a storage device for destinations and loaded from the latter. Only when the driver explicitly states the destination is the driver's destination known to the motor vehicle. This is also a condition for meaningful information for the driver.

SUMMARY

One possible object relates to specifying a possible way of providing the driver with greater control over the use and transmission of his useful data.

The inventors propose a method for transmitting data between a mobile telephone and a motor vehicle, in which a first wireless communication connection is automatically established between the mobile telephone and the motor vehicle when the communication interface of the mobile telephone is activated in a corresponding manner, and driver-specific useful data is transmitted from the mobile telephone to the motor vehicle. According to the proposal, at least some of the useful data to be transmitted to the motor vehicle solely via a second communication connection according to the NFC standard.

Near field communication (NFC) is an international communication standard which is already known in the related art and allows data to be interchanged wirelessly over extremely short distances of less than 4 cm. In this case, it is possible to establish a communication connection over the short distance using corresponding communication devices. A core idea of NFC is that the communication devices of the devices, between which data are intended to be transmitted, must be brought extremely close to one another. This makes data interchange using NFC an extremely deliberate process, in particular since that communication device of the motor vehicle which is intended to be used to establish the second communication connection is arranged in a defined manner and the mobile telephone can preferably be introduced into the transmission range in which the second communication connection can be established only by a deliberate process, therefore the dedicated will of the driver/user to transmit useful data.

In this manner, it is therefore still automatically possible to use the mobile telephone without any relatively great assistance, for example, to set up and carry out telephone calls using operating elements of the motor vehicle. The first communication connection is provided for this purpose and may preferably be in the form of a Bluetooth connection. The first communication connection can therefore preferably be used to make it possible to set up a telephone call using the motor vehicle. These functionalities which are not associated with interchanging private useful data, in particular, are therefore still available to the driver of the motor vehicle, as is fundamentally known. However, the driver can now be certain that at least that part of the useful data which can be transmitted to the motor vehicle only via the second communication connection can actually be transmitted only by a deliberate action, namely by moving his mobile telephone into the communication range of the NFC interface implemented by a communication device in the vehicle by a deliberate action. This provides the driver with considerably improved control over the transmission of his useful data. The driver can himself decide whether and, in particular, which useful data can be used in the motor vehicle, as is also described below.

Overall, the proposal therefore provides the use of two communication connections which are matched to their dedicated intended purposes and one of which is ultimately assigned to non-driver-specific data interchange, in particular telephony, while the other, which requires a deliberate action in order to be set up and to transmit data, can be assigned to driver-specific contents. In this case, it is pointed out that, in particular in a refinement in which the mere entrance of the mobile telephone in that communication range which makes it possible to set up the second communication connection is already sufficient to initialize the transfer of data; an extremely simple transmission possibility which requires little effort by the user but nevertheless requires a deliberate action is therefore also provided in this respect.

Another refinement may provide for a user interface for selecting useful data which can be transmitted solely via the second communication connection to be displayed on the mobile telephone, in particular within the scope of an application, only the useful data selected via the user interface being transmitted to the motor vehicle. In this manner, use is made of an application which can be used by the driver himself to determine which information, that is to say useful data, is intended to be synchronized with the motor vehicle and therefore is intended to be transmitted to the motor vehicle. Even away from the motor vehicle itself, the described application enables an arbitrarily exact choice of useful data which are released for use in the motor vehicle and are transmitted when the second communication connection is established. Whereas a rough selection can be made according to category, for example appointments, contacts, addresses and the like, it is also possible to allow a selection for each individual data record, with the result that, for example, certain contacts, in particular business contacts, can be transmitted to the motor vehicle, but other contacts, for example private contacts, cannot be transmitted. The user determines the interaction with the motor vehicle in a manner which is perfectly clear to the user, as far as the useful data are concerned.

It may be expedient if at least some of the useful data are determined by an evaluation application of the mobile telephone. It is therefore conceivable that an evaluation application is provided on the mobile telephone and evaluates different data which can be acquired by the mobile telephone as useful data which are subsequently useful for at least one motor vehicle system in the motor vehicle. These may be data relating to typical behaviors of the owner of the mobile telephone which are also relevant to his driving. For example, different locations at which a motor vehicle is parked can be assigned to a single ultimate destination in a manner tracked using a GPS sensor; in addition, it is possible to carry out a statistical evaluation of the parking habits of the driver, for example whether the driver readily accepts longer routes and where these lead. It goes without saying that evaluation applications are also conceivable which track inputs by a user and use them to infer further useful data which may be expedient during operation of the motor vehicle, for example with respect to its scheduling and the like.

The useful data can preferably be used to supplement a driver profile stored in the motor vehicle. Motor vehicles have already been proposed in which the driver can be identified in a wide variety of ways, for example using his driving style or using a particular identification apparatus or a personalized key, with the result that vehicle systems can be configured using the driver profile, for example. The useful data may at least be at least partially suitable for supplementing the driver profile in such a manner that better individualization of the operation of the motor vehicle with respect to a particular driver can be effected. This applies in particular when (which will be discussed in even more detail below) vehicle systems are operated with regard to frequent destinations, appointments and the like, but preferred conversation partners and the like may also be derived from user data. The type of driver can also be inferred from the driver's activities which have been determined as useful data, for example by an evaluation application, in particular when merged with data determined by the motor vehicle itself. A wide variety of possibilities are conceivable here.

As already addressed, the useful data can be used when operating at least one vehicle system. As already discussed above, examples which can be mentioned are a hands-free device or generally an application for making telephone calls; however, use in a navigation system is also advantageously conceivable within the scope of the proposals. However, infotainment systems may also use driver-specific useful data stored on a mobile telephone, for example preferred radio stations, music and the like, to improve the individualization of the motor vehicle with respect to the specific driver, in particular if, as explained above, the driver is also identified and a driver profile is then assigned thereto.

Contact data, in particular comprising addresses and/or telephone numbers, and/or appointment data and/or whereabouts of the user of the mobile telephone and/or data relating to the use of the mobile telephone can be used as the useful data, for example.

In one particularly advantageous refinement which could fundamentally also be advantageously used independently of the use of the second communication connection, the useful data, in particular the examples mentioned above, can be used during operation of a navigation system of the motor vehicle. With regard to navigation in particular, a mobile telephone contains a multiplicity of items of driver-specific information which may be of use in a wide variety of processes in the navigation system. This makes it possible to operate the navigation system more simply and in a manner particularly tailored to the driver.

For example, provision may be made for at least some of the useful data, in particular appointment data and/or contact data, to be used to determine a destination. In particular, appointments and/or contacts can therefore be transmitted to the motor vehicle as useful data via the second communication connection and can be used to determine a destination. Although it may be conceivable for the useful data to be used to assist the driver in selecting a destination which then no longer needs to be input by the driver in a cumbersome manner, it is also possible for the useful data, in particular in the case of appointment data, to be automatically evaluated in a manner largely independent of an operator interaction to the effect that a most likely destination of the driver is determined. If, for example, an appointment in the near future has been transmitted with an associated address as useful data, it is highly likely that the driver will now set off for this appointment, with the result that the address of the appointment is very likely to be his destination.

In this case, active guidance to the destination confirmed by the driver, in particular, and/or selected from a plurality of determined destinations can be carried out by the navigation system. As already explained, it is possible to automatically determine the at least one most likely destination and present it to the driver, with the result that it can be confirmed or the driver can select the correct destination from a list of most likely destinations. If this has been carried out, fundamentally known, active navigation to the destination can be carried out; this means that, as known in the related art, the navigation system provides the driver with driving instructions in order to reach the destination. In this case, it is pointed out again at this juncture that, as a result of the use of the second communication connection, the driver need not necessarily share the information leading to the selection of the destination with the motor vehicle, but can do so at any time in a simple manner by a deliberate action, with the result that the useful data are immediately available to the navigation system.

One particularly advantageous, preferred refinement may provide for information relating to traffic obstructions on the route to the destination to be determined and output for at least one destination which is most likely to be selected as passive navigation. It is also conceivable to output a proposed alternative route. The navigation system therefore again uses the useful data to infer a most likely destination to which the driver intends to drive, but the driver does not activate the navigation system for active guidance to the destination in this case but rather drives without the navigation system. In this case, it is also noted at this juncture that it is naturally conceivable to cyclically calculate the most likely destination, the current position of the motor vehicle and data relating to the previous journey naturally also being able to be expediently taken into consideration. This is because initial conclusions of possibly selected destinations can already be drawn from the direction in which a motor vehicle moves along when pulling away.

The navigation system now checks the traffic situation on the route to the most likely destination, in which case a plurality of most likely destinations are also naturally conceivable, for which the traffic situation can be checked. If it is determined that traffic obstructions exist, the navigation system can provide the driver with indications of the obstructions, despite the fact that the driver does not use the navigation system for active navigation, and can possibly even provide proposals for solving the resulting problems, for example alternative routes. In this embodiment, the navigation system therefore inconspicuously monitors the driver's driving without disturbing the driver and intervenes with information only when unexpected changes in the traffic situation, other traffic obstructions and the like arise, for example. This therefore makes it possible to obtain information relating to traffic obstructions on the route likely to be traveled on even during passive route guidance.

Another expedient refinement provides for data relating to past journeys made by the driver to also be used in the motor vehicle when determining the destination. Evaluating such data relating to past journeys ultimately makes it possible to create a habit profile for the journeys made by the driver. If it is known, for example, that the driver drives to his workplace every working day, there is a high probability that he will also do this again on a new working day unless appointments or other calendar entries ("holiday") contained in the useful data indicate otherwise, for example. Evaluating past journeys also makes it possible to learn which routes are preferred by a user of the motor vehicle and will probably also be chosen by the user during a current journey. Data relating to past journeys are therefore a good way to further improve the quality of the navigation provided by the navigation system, here with respect to the determination of the destination.

In a development of the method, it is also advantageous if, in addition to the destination, a future time of the journey and a duration of the journey are also determined, in which case, if the journey is extended in such a manner that it exceeds a threshold value, the motor vehicle transmits a relevant notification to the user. Such a refinement is expedient, in particular, when the navigation system not only seeks to determine the immediately next destination but also already provides a future prediction, by evaluating the useful data, in particular with regard to appointments, of the fact that the driver will again set off for the workplace on the next working day on account of appointments at a particular time, for example. If the motor vehicle now determines, before starting operations to drive to this destination, that there is a problem on account of the traffic situation and this problem is expected to also remain until the journey is started or until the problem area is passed as predicted, the driver may be sent a relevant notification, for example via an SMS or email. The driver can also be advantageously informed, by notification, using a smartphone application; so-called instant messenger and social networks can also be used to deliver the notification. In case of doubt, the driver can set off earlier in order to still be able to keep his appointments.

Another advantageous field of use of the useful data for a navigation system involves the search for a parking space. Provision may be made for at least some of the useful data to be used to determine a suitable parking space. If the navigation system has the additional functionality of also finding a suitable parking space for the driver, useful data from a mobile telephone may provide information in this case. In particular, it is appropriate here to use an evaluation application which comprehends further movement properties outside the motor vehicle, with the result that it is possible to determine, for example, whether a driver willingly crosses a park after he has parked or walks along a row of shop windows. It is also possible to infer how far a driver usually walks after he has parked the motor vehicle and the like. Appointment data can be used to determine the maximum possible distance between a parking space and the location of an appointment being headed for and the like. A multiplicity of possible ways of using useful data in the navigation system are also clearly available with respect to finding a parking space.

A further improvement in the interaction between the navigation system and the mobile telephone results if provision is made for navigation data to be transmitted from the navigation system back to the mobile telephone and to be used there for further guidance of the driver after the journey has been completed. If, for example, a destination cannot be directly reached with the motor vehicle, but rather the motor vehicle must be parked in a remote parking space, for example, data required for the mobile telephone in order to continue to navigate the driver when he begins his walk to the destination can be transmitted to the mobile telephone and accordingly used there. This continues to increase the synergy and considerably reduces the operating effort for a user since the destination does not need to be input to the mobile telephone again but rather is directly used further by the motor vehicle. The first communication connection can be expediently used to transmit these data.

It is pointed out again that use of useful data transmitted by a mobile telephone in a navigation system, in particular appointment data or the like, is also expedient on its own, that is to say independently of the second communication connection according to the NFC standard.

In one advantageous development of the method, a coupling apparatus in the motor vehicle can be used to transmit the useful data via the second communication connection and requires, in particular, the mobile telephone to be held by a person in a transmission position. The coupling apparatus is part of a suitable communication device for establishing the second communication connection. In this case, the coupling apparatus is preferably arranged in such a manner that useful data cannot be "inadvertently" transmitted via the second communication connection, for example as a result of the mobile telephone being placed in a repository or the like provided therefor. This is substantially excluded particularly when the mobile telephone must be held in a communication range in front of the coupling apparatus, and it is increasingly ensured that the practice of transmitting the useful data via the second communication connection is a deliberate operation. For example, the coupling apparatus (symbolized using a coupling area for example) may be arranged in the region of a center console, for example close to a man-machine interface, and may be accordingly identified. However, it is also conceivable, in principle, to use a coupling apparatus on which the mobile telephone can be briefly inserted into a provided holder in order to transmit the useful data but which is then accordingly identified and does not correspond to a conventional storage location for a mobile telephone in a motor vehicle.

In addition to the method, the inventors also propose a motor vehicle comprising at least one communication device for establishing a first communication connection to a motor vehicle, the communication device or a further communication device being designed to establish a second communication connection according to the NFC standard for the purpose of transmitting selected useful data from a mobile telephone to the motor vehicle. The proposed motor vehicle is therefore suitable for carrying out the method, with the result that all statements made with respect to the method can similarly be applied to the motor vehicle and the advantages can also be achieved using said motor vehicle. It therefore makes it possible to set up not only a first, longer-range communication connection to the mobile telephone but rather to establish, for at least some of the useful data to be transmitted, a second communication connection which has a considerably shorter range, in particular a range of less than or equal to 4 cm, and therefore complies with the NFC standard, in particular.

In another refinement of the motor vehicle, provision may be made for the communication device to comprise, for the purpose of establishing the second communication connection, a coupling apparatus which requires, in particular, a person to hold the mobile telephone in a transmission position. As already explained above, such a refinement ideally avoids the inadvertent transmission of useful data and provides this as a deliberate action to be deliberately carried out by the driver.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
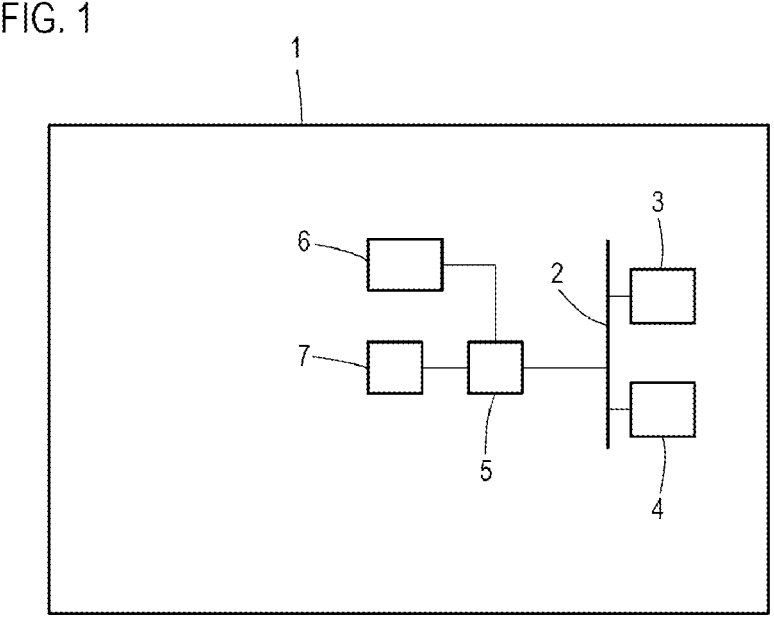
FIG. 1 shows a motor vehicle according to one potential embodiment of the the invention.

Reference will now be made in detail to the preferred embodiments of the present invention, examples of which are illustrated in the accompanying drawings, wherein like reference numerals refer to like elements throughout.

FIG. 1 shows a basic outline of a motor vehicle 1. As is fundamentally known, this motor vehicle has a bus system 2 to which different vehicle systems are connected, of which a navigation system 3 and a hands-free device 4 are shown by way of example. Both the navigation system 3 and the hands-free device 4 use useful data transmitted by a mobile telephone, a special control device 5 controlling communication with the mobile telephone in the present case, which communication is carried out using two communication devices 6, 7 in the present case. In this case, as will be described in yet more detail below, the communication device 6 is used to establish a first, longer-range communication connection, a Bluetooth connection in the present case. The Bluetooth communication connection is automatically established with each mobile telephone whose Bluetooth interface is activated and is used, in particular, to carry out telephone calls for the hands-free device 4 via the motor vehicle 1 under the control of the mobile telephone.

The second communication device 7, in which case the communication devices 6 and 7 can also be implemented in a structural unit, is used to set up an extremely short-range second communication connection, a connection according to the NFC standard with a range of up to 4 cm in the present case. This second communication connection is intended to be used to transmit driver-specific useful data from the mobile telephone to the motor vehicle 1, where they can be used by its vehicle systems, in particular the navigation system 3 and the hands-free device 4.

Figure 2:
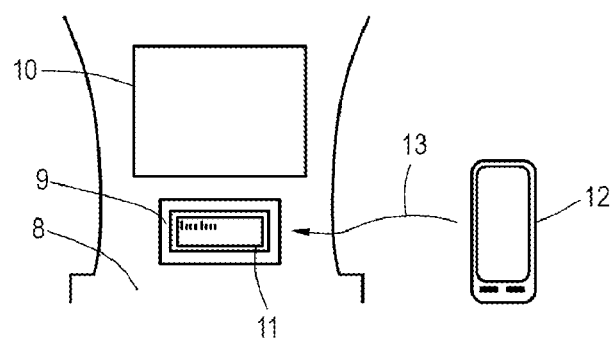
FIG. 2 shows a view of the center console of the motor vehicle from FIG. 1.

FIG. 2 shows a coupling apparatus 9 as part of the second communication device 7 on the center console 8 of the motor vehicle 1, the coupling apparatus 9 being provided below a man-machine interface 10 of the motor vehicle 1 in the present case. It appears to the user as a flat substantially rectangular area on which a symbolic representation 11 of a mobile telephone is shown. In order to be able to establish the second communication connection, a mobile telephone 12 must be held in the immediate vicinity of the coupling apparatus 9, as indicated by the arrow 13. For this purpose, it is necessary for the mobile telephone 12 to be held to the coupling apparatus 9, which constitutes a deliberate, targeted action, with the result that useful data cannot be inadvertently transmitted. Since inadvertent placement of the mobile phone 12 is unlikely anyway on account of the position of the coupling apparatus 9, a holder for briefly placing the mobile telephone 12 in order to transmit the useful data may also be provided there.

Figure 3:
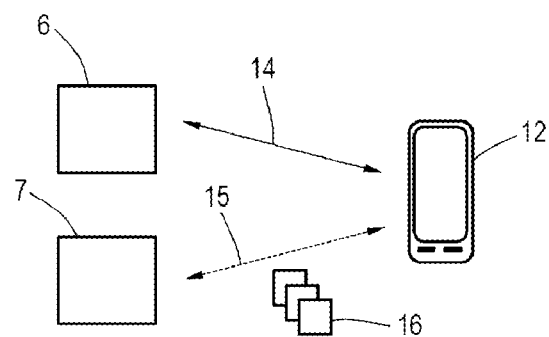
FIG. 3 shows a view of the resulting communication connections.

The specific communication structure which can be achieved with the motor vehicle 1 by the proposed method is illustrated in more detail by FIG. 3. A first communication connection 14 clearly exists between the mobile telephone 12 and the first communication device 6, which connection is in the form of a Bluetooth connection and is used mainly to interchange control data for using the motor vehicle to make a telephone call or for other services. Driver-specific useful data are not transmitted via the first communication connection 14. The second communication connection 15 existing only when the mobile telephone 12 is suitably positioned is provided for this purpose and is set up between the mobile telephone 12 and the second communication device 7. This communication connection can be used to transmit useful data 16 which can then supplement a driver profile as part of the latter, for example, and can be used by vehicle systems.

In the exemplary embodiment illustrated here, by establishing the second communication connection 15, the driver not only deliberately decides that useful data 16 are intended to be transmitted but also which useful data. A user interface can be displayed for this purpose as part of an application on the mobile telephone 12 and allows the user of the mobile telephone 12 to select which useful data are intended to be transmitted to the motor vehicle 1 via the second communication connection 15. In this case, the user can select both categories and individual data records.

Useful data 16 which can be transmitted via the second communication connection 15 may be of a wide variety of types if they can only be expediently used inside at least one vehicle system. The useful data 16 may comprise, for example, contact data which can be used to set up telephone calls initiated by an operating action in the motor vehicle 1. Contact data, in particular their addresses, and appointment data prove to be important useful data for use by the navigation system 3, which will be discussed in yet more detail below. In addition to useful data ultimately input by the user himself, an evaluation application may also be provided in the mobile telephone 12, which application itself generates useful data 16, for example a position data list which indicates routes of the user or other data which describe the user's behavior, for example his routes after the motor vehicle 1 has been parked, from which parking habits and optimal parking spaces for the user can be inferred. For all of these useful data 16, in which case further useful data 16 are also naturally conceivable, the user has the choice, on account of the user interface, whether he would like to transmit the data via the second communication connection 15 and initiates this transmission by bringing the mobile telephone 12 closer to the coupling apparatus 9.

As already mentioned, useful data 16 can be used in a particularly advantageous manner during operation of the navigation system 3, in particular contact data and appointment data. These make it possible for the navigation system 3 to be able to determine at least one most likely destination of the driver during a journey. The most likely destinations can be generated and displayed as a list in the navigation system 3, with the result that the driver can select a destination if he wishes active guidance by the navigation system 3. If only one most likely destination has been determined, the driver can confirm this destination for active guidance by the navigation system 3. However, such evaluation of useful data by the navigation system 3 also enables passive route guidance if it is determined, for the at least one most likely destination which is nevertheless determined even if the driver does not desire any active guidance, whether traffic obstructions or other disruptions are present on the route. If this is the case, the navigation system 3 can nevertheless output an indication and accordingly possibly additional information, for example an alternative route, in order to also improve the driver assistance for such a case.

During the particularly cyclical determination of the most likely destination, the navigation system 3 also uses further data, in particular data relating to the current journey which describe the distance which has already been covered, but also data relating to past journeys from which habitual patterns can be derived, in particular journeys which are made regularly. If these are linked to appointment data, a good prediction can be delivered, incidentally also for the future. If times for likely journeys are determined, for example using a particular appointment, it is also possible to continuously monitor the extent to which traffic obstructions would prevent punctual appearance and the driver can be informed by the motor vehicle 1, for example via an SMS or the like. Additionally or alternatively, it is also conceivable to notify the driver using a smartphone app, a social network or an instant messenger.

Contact data often comprise addresses, with the result that destinations can be predicted in an improved manner, in particular, by linking to appointment data even during their use.

Nevertheless, useful data may also be used differently by the navigation system 3, for example if the navigation system 3 also selects optimum parking spaces for the user, that is to say the driver, in order to navigate there. The driver's preferences which result from the user data described above, for example choosing the route through a park rather than along shop windows, can be taken into account.

If a parking space has been found, the remaining data for reaching the destination are transmitted to the mobile telephone 12, with the result that the navigation to the destination can be continued there after the journey has been completed. It is also advantageous if the parking space or generally the position of the motor vehicle 1 is transmitted to the mobile telephone 12 and stored there since navigation back to the motor vehicle 1 can then be achieved using the mobile telephone 12. In this manner, the driver therefore also has complete guidance and navigation outside the motor vehicle 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for transmitting data between a mobile telephone and a motor vehicle, comprising:
   automatically establishing a first wireless communication connection between the mobile telephone and the motor vehicle when a communication interface of the mobile telephone is activated in a corresponding manner;
   using a user interface of the mobile telephone to display useful data;
   using the user interface for a user of the mobile telephone to designate driver-specific useful data to indicate that the driver-specific useful data is transmittable only over a second wireless communication connection according to a Near Field Communication (NFC) standard and is not transmittable over the first wireless communication connection; and
   transmitting the driver-specific useful data from the mobile telephone to the motor vehicle solely via the second wireless communication connection according to the NFC standard.

2. The method as claimed in claim 1, wherein
   a Bluetooth connection is used as the first wireless communication connection, and
   the first wireless communication connection is used to set up a telephone call via the motor vehicle.

3. The method as claimed in claim 1, wherein at least some of the useful data are determined by an evaluation application of the mobile telephone for potential designation by the user of the mobile telephone via the user interface of the mobile telephone.

4. The method as claimed in claim 1, wherein the driver-specific useful data are used when operating at least one vehicle system.

5. The method as claimed in claim 1, wherein the driver-specific useful data are used during operation of a navigation system of the motor vehicle.

6. The method as claimed in claim 5, wherein the driver-specific useful data include appointment data and/or contact data, which are used by the navigation system to determine a destination.

7. The method as claimed in claim 6, wherein
   the navigation system presents at least one potential destination to a driver of the motor vehicle based on the appointment data and/or the contact data,
   the destination is selected from the at least one potential destination, and
   active guidance to the destination is carried out by the navigation system.

8. The method as claimed in claim 6, wherein
   the navigation system uses the driver-specific useful data to identify a most likely destination,
   the navigation system assumes the most likely destination and performs passive navigation, and
   information relating to traffic obstructions on a route to the most likely destination are determined and output to the driver.

9. The method as claimed in claim 6, wherein data relating to past journeys made by the driver are used in the motor vehicle when determining the destination.

10. The method as claimed in claim 6, further comprising:
using the driver-specific useful data in the motor vehicle to identify a future journey to a future potential destination;
predicting a predicted duration of the future journey;
using the driver-specific useful data to identify a threshold duration for the future journey; and
transmitting a relevant notification to the user of the mobile telephone if the predicted duration exceeds the threshold duration.

11. The method as claimed in claim 10, wherein
the driver-specific useful data comprises appointment data, and
the appointment data are used to determine the threshold duration.

12. The method as claimed in claim 5, wherein the navigation system uses at least some of the driver-specific useful data to determine a suitable parking space.

13. The method as claimed in claim 5, wherein
the driver-specific useful data are used by the navigation system to navigate a journey of the motor vehicle to a destination, and
navigation data are transmitted from the navigation system to the mobile telephone for further guidance of the user of the mobile telephone after the motor vehicle has reached the destination.

14. The method as claimed in claim 5, wherein
the driver-specific useful data are used by the navigation system to navigate a journey of the motor vehicle to a destination, and
after reaching the destination, information identifying a parking space location is transmitted from the navigation system to the mobile telephone for further guidance of the user of the mobile telephone.

15. The method as claimed in claim 1, wherein
a coupling apparatus in the motor vehicle is used to transmit the driver-specific useful data via the second wireless communication connection, and
the coupling apparatus requires the mobile telephone to be held in a transmission position.

16. The method as claimed in claim 15, wherein the coupling apparatus comprises a holder into which the mobile telephone is inserted.

17. A motor vehicle comprising:
at least one communication apparatus to establish a first wireless communication connection from the motor vehicle to a mobile telephone and to establish a second wireless communication connection according to a Near Field Communication (NFC) standard from the motor vehicle to the mobile telephone, for transmitting useful data designated by a user from the mobile telephone to the motor vehicle,
wherein the at least one communication apparatus is configured to perform the method as claimed in claim 1.

18. The motor vehicle as claimed in claim 17, wherein the motor vehicle further comprises, for establishing the second wireless communication connection, a coupling apparatus which holds the mobile telephone in a transmission position.

19. A method for transmitting data between a mobile telephone and a motor vehicle, comprising:
automatically establishing a first wireless communication connection between the mobile telephone and the motor vehicle when a communication interface of the mobile telephone is activated in a corresponding manner;
using a user interface of the mobile telephone to display useful data;
using the user interface for a user of the mobile telephone to select driver-specific useful data; and
transmitting the driver-specific useful data from the mobile telephone to the motor vehicle solely via a second wireless communication connection according to a Near Field Communication (NFC) standard,
wherein
a driver profile is stored in the motor vehicle, and
the driver-specific useful data are used to supplement the driver profile.

20. A method for transmitting data between a mobile telephone and a motor vehicle, comprising:
automatically establishing a first wireless communication connection between the mobile telephone and the motor vehicle when a communication interface of the mobile telephone is activated in a corresponding manner;
using a user interface of the mobile telephone to display useful data;
using the user interface for a user of the mobile telephone to select driver-specific useful data; and
transmitting the driver-specific useful data from the mobile telephone to the motor vehicle solely via a second wireless communication connection according to a Near Field Communication (NFC) standard,
wherein the driver-specific useful data are selected from the group consisting of address contact data, telephone number contact data, appointment data, data regarding whereabouts of the user of the mobile telephone and data relating to use of the mobile telephone.

* * * * *